US007997154B2

(12) United States Patent
Oguma et al.

(10) Patent No.: US 7,997,154 B2
(45) Date of Patent: Aug. 16, 2011

(54) ROLLING BEARING DEVICE WITH SENSOR (75) Inventors: Noriyasu Oguma, Toyama (JP); Mahito Shiba, Yamatotakada (JP); Masahiro Kiji, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 112 days.

(21) Appl. No.: 12/312,142

(22) PCT Filed: Oct. 31, 2007

(86) PCT No.: PCT/JP2007/071251
§ 371 (c)(1),
(2), (4) Date: Apr. 28, 2009

(87) PCT Pub. No.: WO2008/053933
PCT Pub. Date: May 8, 2008

(65) Prior Publication Data
US 2010/0064824 A1 Mar. 18, 2010

(30) Foreign Application Priority Data

Nov. 1, 2006 (JP) .................... P2006 297637
Jan. 22, 2007 (JP) .................... P2007-011850

(51) Int. Cl.
*G01L 1/00* (2006.01)
(52) U.S. Cl. ................................. 73/862.541
(58) Field of Classification Search ............ 73/862.541, 73/862.322, 862.381, 862, 391, 392
See application file for complete search history.

(56) References Cited

U.S. PATENT DOCUMENTS

| 6,338,281 | B1 * | 1/2002 | El-Ibiary et al. ......... 73/862.381 |
| 6,339,956 | B1 | 1/2002 | Huinink et al. |
| 6,920,801 | B2 * | 7/2005 | Van Leeuwen et al. ... 73/862.49 |
| 7,245,123 | B2 * | 7/2007 | Inoue et al. .................... 324/209 |
| 7,249,528 | B2 * | 7/2007 | Inoue ....................... 73/862.392 |
| 2005/0150283 | A1 | 7/2005 | Shick et al. |

FOREIGN PATENT DOCUMENTS

| JP | 2000-203217 | 7/2000 |
| JP | 2004-3918 | 1/2004 |
| JP | 2004-45370 | 2/2004 |
| JP | 2005-528270 | 9/2005 |
| JP | 2006-9866 | 1/2006 |
| JP | 2006-144868 | 6/2006 |
| JP | 2006-145016 | 6/2006 |
| JP | 2006-145457 | 6/2006 |
| JP | 2006-177932 | 7/2006 |

(Continued)

*Primary Examiner* — Lisa M Caputo
*Assistant Examiner* — Octavia Davis
(74) *Attorney, Agent, or Firm* — McGinn IP Law Group, PLLC (57) ABSTRACT

[Resolving Means] A rolling bearing device with a sensor includes: a tubular fixed bearing ring which is fixed to a vehicle body side; a rotating bearing ring which is rotatably inserted in an interior of the fixed bearing ring and is fixed to a tire side; rolling elements which are rollably disposed between these bearing rings; and a sensor device disposed on a fixed bearing ring side. The sensor device has at least two sensors which are arranged at positions perpendicular to each other in a circumferential direction of the fixed bearing ring, and which are respectively capable of detecting the ground contact load of the tire, the sensor device being so constructed as to be able to detect a ground contact load of the tire based on cycles of outputs obtained from the at least two sensors.

5 Claims, 7 Drawing Sheets

FOREIGN PATENT DOCUMENTS

| | | |
|---|---|---|
| JP | 2006-177933 | 7/2006 |
| JP | 2006-201116 | 8/2006 |
| JP | 2006-290490 | 10/2006 |
| JP | 2006-292027 | 10/2006 |

\* cited by examiner

LOAD INCREASING SIDE
LOAD DECREASING SIDE la

FIG. 5B

LOAD INCREASING SIDE
LOAD DECREASING SIDE lb

ROLLING BEARING DEVICE WITH SENSOR

TECHNICAL FIELD

The present invention relates to a rolling bearing device with a sensor. More particularly, the present invention concerns a rolling bearing device with a sensor for detecting a load (tire ground contact load: tire force) acting on a wheel by sensors disposed on a fixed bearing ring (outer ring) constituting the bearing device.

BACKGROUND ART

In recent years, in automobiles, various information is required on such as the load acting on wheels and the rotational speed of the wheels in order to affect driving control at the time of traveling. To obtain such information, a proposal has been made to provide a sensor device to a rolling bearing device for a wheel to which the wheel of an automobile is mounted.

The eccentricity of the tire as an example of information concerning the state of the wheel during traveling is brought about by such as a faulty wheel balance, a decrease of tire air pressure, and an unbalanced weight of the tire (e.g., a case where a stone is sandwiched between dual tires of a large-sized vehicle). If the automobile is caused to travel with an eccentric tire, vibrations can be generated to aggravate the riding comfort, and traveling stability can be impaired. In some cases, there is a possibility of the tire undergoing a fatigue to result in a burst.

Accordingly, various techniques for detecting an abnormality of the tire including such eccentric have hitherto been proposed. For example, patent document 1 discloses a device for detecting an abnormality of the tire by disposing in the tire a sensor for detecting the force transmitted from the tire. In addition, patent document 2 discloses a system wherein the tire inflation pressure, the temperature of a belt edge, and the like are measured, and collation is made with a damaged model prepared in advance as a map to thereby affect the monitoring or diagnosis of the vehicle tire.

Meanwhile, as such a sensor device for detecting the load acting on the wheel, a sensor device has been proposed which consists of a magnetic impedance sensor provided on, for instance, the fixed bearing ring and a magnetized portion provided in face-to-face relation to that magnetic impedance sensor (e.g., patent document 3). In this sensor device, however, since the detection by the magnetic impedance sensor is affected by such as the material and the shape of a portion to be detected, there have been problems in that there is a restriction in the selection of the material of the rolling bearing, and that the processing of the magnetized portion and the addition of another member are required for the portion to be detected.

Accordingly, as a rolling bearing device with a sensor in which such a restriction in material selection is small and additional processing is made unnecessary, a rolling bearing device with a sensor has been proposed in which ultrasonic sensors are disposed on the fixed bearing ring to thereby detect the force acting between the rolling element and the fixed bearing ring as echo ratios (e.g., patent document 4).

The rolling bearing device with a sensor disclosed in this patent document 4 has a sensor device which is comprised of ultrasonic sensors which are provided at least two positions spaced apart a predetermined interval in the circumferential direction of a fixed-side bearing member and adapted to detect the rolling element load as an echo ratio, as well as a processor for determining from outputs of the ultrasonic sensors at least a component in a vertical direction and a component in a left-right direction among three-direction components of the load acting on the rolling bearing. Additionally, it is stated therein that it is also possible to determine not only the three-direction components but also moments about an X-axis, a Y-axis, and a Z-axis.

[Patent Document 1] JP-2000-203217A
[Patent Document 2] Published Japanese translation of a PCT application JP 2005-528270T
[Patent Document 3] JP-2004-45370A
[Patent Document 1] JP-2006-177932A

DISCLOSURE OF THE INVENTION

Problems that the Invention is to Solve

However, in the device disclosed in the patent document 1, depending on the relationship between the installed position of the sensor and the eccentric position of the tire, there are cases where it is impossible to make a distinction between the fluctuation of the tire load attributable to the eccentricity and the fluctuation of the vertical load of the tire attributable to such as a disturbance of the road surface. In addition, since a wireless system is adopted in which a signal from a sensor installed in the tire is received by the vehicle body side, there is a problem in that the equipment cost becomes high.

Further, in the method of detecting the rolling element load through an ultrasonic echo, i.e., the wire ground contact load, since the detection of the echo ratio becomes possible as the rolling element passes the location where the ultrasonic sensor is installed, the response in the load calculation by the sensor device is dependent upon the outer ring passage frequency of the rolling element based on the rotation of the inner ring of the bearing device. In other words, since the response in the load calculation is dependent upon the speed of the motor vehicle in which the bearing device is mounted, there are cases where the response drops during the low speed.

On the other hand, as for the response in the detection of the tire ground contact load for vehicle motion control, 100 Hz at the latest is necessary since the natural frequency of a general radial tire is 90 to 110 Hz. Hence, with the conventional methods using ultrasonic sensors, a problem remained in the response of the load detection during the low speed.

The invention has been devised in view of the above-described circumstances, and an object of the invention is to provide a highly reliable rolling bearing device with a sensor which is capable of detecting the load acting on the wheel. Another object is hence to provide a rolling bearing device with a sensor which is capable of detecting the eccentricity of the tire reliably and at low cost; and to provide a rolling bearing device with a sensor which is capable of improving the response in the load detection even during the low speed.

Means for Solving the Problems

A rolling bearing device with a sensor in accordance with the present invention is a rolling bearing device with a sensor comprising: a tubular fixed bearing ring which is fixed to a vehicle body side; a rotating bearing ring which is rotatably inserted in an interior of the fixed bearing ring and is fixed to a tire side; rolling elements which are rollably disposed between these bearing rings; and a sensor device disposed on a fixed bearing ring side, wherein the sensor device has at least two sensors so as to be arranged at positions perpendicular to each other in a circumferential direction of the fixed bearing ring, the sensor device is constructed so as to be able to detect a ground contact load of the tire based on cycles of outputs obtained from the at least two sensors.

Further, an eccentricity of the tire can be arranged to be detected based on cycles of outputs obtained from the two sensors.

The rolling bearing device with a sensor in accordance with the invention is provided with at least two sensors arranged at positions perpendicular to each other in the circumferential direction of the fixed bearing ring. Namely, the sensors are respectively disposed, for example, at an upper portion or a top portion of the fixed bearing ring and at a front portion or a rear portion of the fixed bearing ring, which is at a position orthogonal thereto with the center of the bearing as a reference. The sensor disposed at the upper portion or the top portion of the fixed bearing ring is capable of detecting a vertical load $F_Z$ in the vertical direction of the tire among three component forces (the vertical load $F_Z$, a front-back load $F_X$, and a horizontal load FY of the tire) of the tire force or the tire ground contact load. Meanwhile, the sensor disposed at the lower portion or the bottom portion of the fixed bearing ring is similarly capable of detecting the front-back load $F_X$ in the front-back direction of the tire.

The vertical load $F_Z$ of the tire can sometimes fluctuate slightly even in the state of normal traveling, but the front-back load $F_X$ normally does not fluctuate unless the brake is stepped on. Accordingly, the vertical load $F_z$ and the front-back load $F_X$ are calculated from outputs of the two sensors, and fluctuation cycles $T_{FZ}$ and $T_{FX}$ of $F_Z$ and $F_X$ are calculated by a cycle calculating circuit, and a difference $\Delta T$ between the two cycles of fluctuation is calculated. In addition, a rotation cycle T of the tire is separately calculated from the vehicle speed.

Then, in a state in which the brake has not been stepped on, a diagnosis is started as t whether or not the tire is eccentric, and it is determined that the tire is eccentric when both the fluctuation cycles $T_{FZ}$ and $T_{FX}$ are equal to the rotation cycle T, and the difference $\Delta T$ between these cycles is ¼ of the rotation cycle. Furthermore, an arrangement can be provided such that when a fluctuation amount $\Delta T$ (magnitude of the amplitude) of the front-back load $F_X$, at which level the effect of road surface vibration is small and the fluctuation can be regarded as the load fluctuation due to tire eccentricity, has exceeded a predetermined value, it is determined that the vehicle is in an abnormal state possibly causing trouble to the traveling of the vehicle, whereupon an alarm is issued to the driver. According to the invention, the aforementioned abnormal state can be detected with high sensitivity even if it is of such a measure that it cannot be felt by a person. Thus, a risk can be prevented in advance by issuing an alarm to the driver before serious tire damage occurs.

The above-described sensors may be ultrasonic sensors. Further, the two sensors may be a sensor for detecting a load in a vertical direction of the tire and a sensor for detecting a load in a front-back direction of the tire.

Furthermore, an arrangement may be provided such that the number of the rolling elements is an odd number, and the sensor device includes at least a pair of ultrasonic sensors arranged at positions where they oppose each other with respect to an axis of the bearing device, wherein if it is assumed that A is a constant, n is the number of rolling elements, V is a vehicle speed, r is a tire radius, Da is a rolling element diameter, θ is a contact angle, and dm is a pitch circle diameter, a rolling element outer ring passage frequency fo, which is expressed by fo=A·n·V/r(1−Da·cos θ/dm), is 50 Hz or more when V≦40 (km/h), and wherein the sensor device performs load calculation by using an output of the ultrasonic sensor on a load increasing side and an output of the ultrasonic sensor on a load decreasing side in a zigzag manner between the pair of ultrasonic sensors.

In the rolling bearing device with a sensor in accordance with the invention, an arrangement is provided such that the rolling element outer ring passage frequency fo, i.e., the frequency fo at which the rolling element passes an outer ring portion where the ultrasonic sensor is disposed, becomes 50 Hz or more when V≦40 (km/h). In addition, the arrangement provided is such that the number of the rolling elements is an odd number, and load calculation is performed by using an output of the ultrasonic sensor on the load increasing side and an output of the ultrasonic sensor on the load decreasing side in a zigzag manner between the pair of ultrasonic sensors arranged at positions where they oppose each other with respect to the axis of the bearing device. As the number of the rolling elements is set to an odd number, outputs of the pair of ultrasonic sensors can be made to appear alternately, and if these outputs are used in a zigzag manner, as will be described later, opportunities of the load calculation can be made two-fold the number of outputs of the ultrasonic sensors (rolling element outer ring passage frequency fo). Hence, the calculation response can be set to 50 Hz×2=100 Hz or more even when V≦40 (km/h), thereby making it possible to improve the response during the low speed.

Preferably, the number of rolling elements n and the rolling element diameter Da (mm) are selected from within a range which is surrounded by straight or curved lines represented by:

Da=5.6,

Da=an+b, and

Da=cn²+dn+e.

As the number of rolling elements and the rolling element diameter Da are selected from within this range, the size of the bearing can be kept within a predetermined range, and the rolling element outer ring passage frequency fo can be set to 50 Hz or more when V≦40 (km/h), while ensuring the prescribed service life of the bearing.

Advantages of the Invention

According to the rolling bearing device with a sensor in accordance with the invention, it is possible to detect the load acting on the wheel with higher reliability and detect the eccentricity of the tire reliably and at low cost. Further, it is possible to improve the response of load detection during the low speed.

BEST MODE FOR CARRYING OUT THE INVENTION

Hereafter, referring to the accompanying drawings, a detailed description will be given of an embodiment of a rolling bearing device with a sensor (hereafter also referred to simply as the "bearing device") in accordance with the invention.

Figure 1:
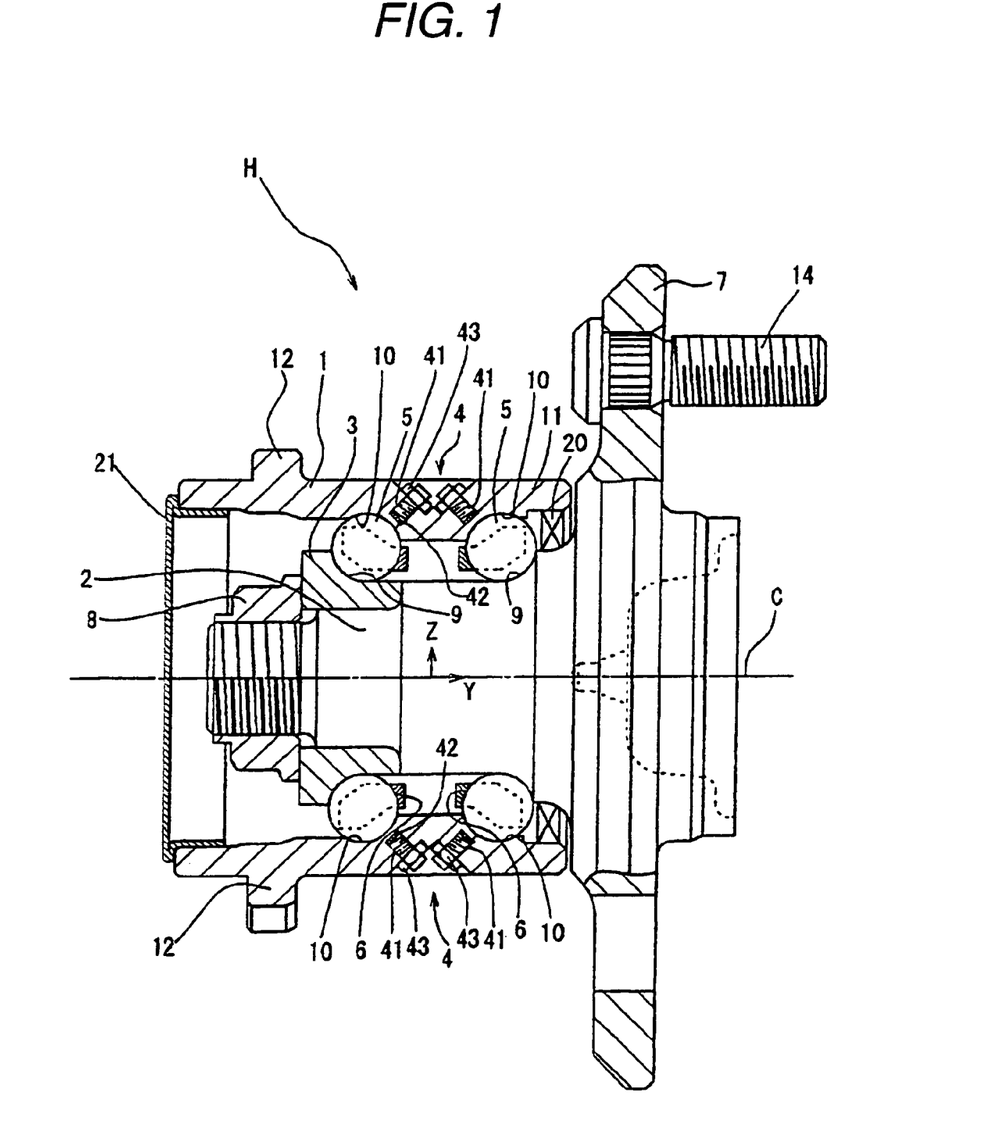
FIG. 1 is an explanatory axially cross-sectional view of a bearing device in accordance with an embodiment of the invention.

FIG. 1 is an explanatory axially cross-sectional view of a bearing device H in accordance with an embodiment of the invention. It should be noted that, in FIG. 1, the right side is an outer side of the vehicle, and the left side is an inner side of the vehicle.

As shown in FIG. 1, the bearing device H in accordance with this embodiment is constituted by a tubular outer ring 1, an inner shaft 2 which is rotatably inserted in the interior of this outer ring 1; an inner ring member 3 which is fitted over a vehicle inner-side end portion of this inner shaft 2, a sensor device 4 provided on the outer ring 1, and double row rolling elements 5, 5 constituted by a plurality of balls arranged in the circumferential direction. A double row angular ball bearing portion is constructed by them. The balls in each row as the rolling elements 5, 5 are retained by a cage 6 at predetermined intervals in the circumferential direction.

It should be noted that, in this specification, a direction extending along a center line C of the bearing device H is defined as a Y-axis direction, a horizontal direction perpendicular thereto, i.e., a direction of penetrating the plane of paper, is defined as an X-axis direction, and a vertical direction perpendicular to the Y-axis direction and the X-axis direction is defined as a Z-axis direction. Accordingly, the X-axis direction corresponds to the front-back horizontal direction of a wheel, the Y-axis direction corresponds to the left-right horizontal direction (axial direction) of the wheel, and the Z-axis direction corresponds to the vertical direction.

In the bearing device H in accordance with this embodiment, the aforementioned outer ring 1 is set as a fixed bearing ring which is fixed to the vehicle body side. Meanwhile, the aforementioned inner shaft 2 and the inner ring member 3 are set as a rotating bearing ring on the wheel side, and the aforementioned double row rolling elements 5, 5 are rollably interposed between the fixed bearing ring and the rotating bearing ring. Consequently, the fixed bearing ring and the rotating bearing ring are disposed coaxially with each other, and the rotating bearing ring is rotatable together with the wheel (not shown) with respect to the fixed bearing ring.

The inner shaft 2 constituting the rotating bearing ring has on the vehicle outer side a flange portion 7 extending radially outward, and this flange portion 7 serves as a mounting portion for a tire wheel or a brake disk of the wheel. This tire wheel or the like is mounted to that flange portion 7 by means of mounting bolts 14. The inner ring member 3 is fitted over a stepped portion formed on the vehicle inner side of the inner shaft 2, and is fixed to the inner shaft 2 by means of a nut 8 which is threadedly engaged with a vehicle-inner-side end portion of the inner shaft 2. Further, inner raceway surfaces 9, 9 of the rolling elements 5, 5 are respectively formed on an outer peripheral surface of the inner shaft 2 and an outer peripheral surface of the inner ring member 3.

The outer ring 1 constituting the fixed bearing ring has a cylindrical main-body tubular portion 11 on an inner peripheral surface of which outer raceway surfaces 10, 10 of the rolling elements 5, 5 are formed, as well as a flange portion 12 extending radially outward from an outer peripheral surface of this main-body tubular portion 11. This flange portion 12 is fixed to a knuckle (not shown) provided in a suspension device which is a vehicle-side member, thereby allowing the bearing device H to be fixed to the vehicle body side.

A seal unit 20 is provided between an inner peripheral surface of a vehicle outer-side end portion of the outer ring 1 and an outer peripheral surface of the inner shaft 2 opposing it, and a cover 21 is press-fitted to an inner peripheral surface of a vehicle inner-side end portion of the outer ring 1.

The aforementioned sensor device 4 is provided with ultrasonic sensors 41 for detecting forces acting between the outer ring 1 and the rolling elements 5, as well as a processor (not shown) connected to these ultrasonic sensors 41 via unillustrated lead wires and adapted to process outputs from these ultrasonic sensors 41.

The ultrasonic sensors 41 are respectively provided at an uppermost portion (top portion) and a lowermost portion (bottom portion) of the outer ring 1 shown in FIG. 1 and on the front side and the rear side of a vertically intermediate portion of the outer ring 1. In other words, the ultrasonic sensors 41 are disposed at 90° intervals in the circumferential direction, and those sensors that are adjacent to each other in the circumferential direction are in such a relationship that segments connecting the axis and the respective sensors are perpendicular to each other. Namely, two pairs of ultrasonic sensors 41 are arranged in pairs at mutually opposing positions with respect to the axis of the bearing device H. It should be noted that the layout and the number of the ultrasonic sensors 41 are not limited to the same, and may be another layout or number insofar as at least two sensors are provided which are arranged at positions where they are perpendicular to each other in the circumferential direction of the outer ring 1.

The above-described ultrasonic sensor 41 has a tubular case on an outer peripheral surface of which an externally threaded portion is formed and an oscillator disposed within that case. The ultrasonic sensor 41 is opposed to a contact surface between the rolling element 5 and the outer raceway surface 10 from a vertical direction. A bottomed internally threaded portion is formed in the outer ring 1 to allow the amount of screwing in of the aforementioned case to be adjusted. A rubber-made cushion sheet 42 for protecting a distal end face of the ultrasonic sensor 41 is interposed between a leading end face of the case and a bottom surface of the internally threaded portion. In addition, a nut for preventing the rotation of the case is threadedly engaged with a proximal end-side portion of the externally threaded portion of the case.

The above-described ultrasonic sensor 41 transmits ultrasonic waves from its transmitting/receiving surface toward a contact portion 22 between the rolling element 5 and the outer raceway surface 10, and receives at the transmitting/receiving surface a reflected wave reflected by that contact portion 20, thereby allowing the force acting on the rolling element 5 to be detected as an echo ratio shown below.

$$\text{Echo ratio} = 100 \times (H0 - H1)/H0$$

H0: echo strength when the rolling element 5 is located by being spaced apart a half pitch from the ultrasonic sensor 41

H1: echo strength when the rolling element 5 is located immediately below the ultrasonic sensor 41

This echo ratio has a proportional relationship with the force acting on the rolling element 5, and the force acting on the rolling element 5 can be obtained from this echo ratio by making use of this relationship. If the force acting on the rolling element 5 becomes large, the contact area between the rolling element 5 and the outer raceway surface 10 becomes large, and the echo strength becomes small. Accordingly, in a case where the force acting on the rolling element 5 is large, a large echo ratio is outputted.

When the load acting on the tire changes in conjunction with a speed change or attitude change of the traveling vehicle, the external force with respect to the inner shaft 2 changes in correspondence with this change of load, and the magnitude of the force acting on the rolling element 5 changes. In addition, the manner in which the force acts on the inner shaft 2 differs for each component in the front-back direction, the left-right direction, and the vertical direction of the load acting on the tire. For this reason, the degree of effect on the force acting on the rolling element 5, which is detected by each ultrasonic sensor 41, differs among the components in each direction.

Accordingly, by determining in advance a force acting on the rolling element 5 when a load in the front-back direction is applied to the tire as well as an echo ratio outputted from each ultrasonic sensor 41 corresponding thereto, a force acting on the rolling element 5 when a load in the left-right direction is applied to the tire as well as an echo ratio outputted from each ultrasonic sensor 41 corresponding thereto, and a force acting on the rolling element 5 when a load in the vertical direction is applied to the tire as well as an echo ratio outputted from each ultrasonic sensor 41 corresponding thereto, it is possible to determine components in the three directions of the load acting on the tire from the echo ratios obtained from the respective ultrasonic sensors 41. It should be noted that the processor of the sensor device 4 is provided with, among others, a storage unit storing a formula for determining the aforementioned echo ratio, a formula for determining from that echo ratio the force acting on the rolling element 5 corresponding to the position of each ultrasonic sensor 41, and formulae for determining from the force acting on the rolling element 5 the front-back load, the left-right load, and the vertical load acting on the tire, as well as an arithmetic unit for calculating these formulae.

Figure 2:
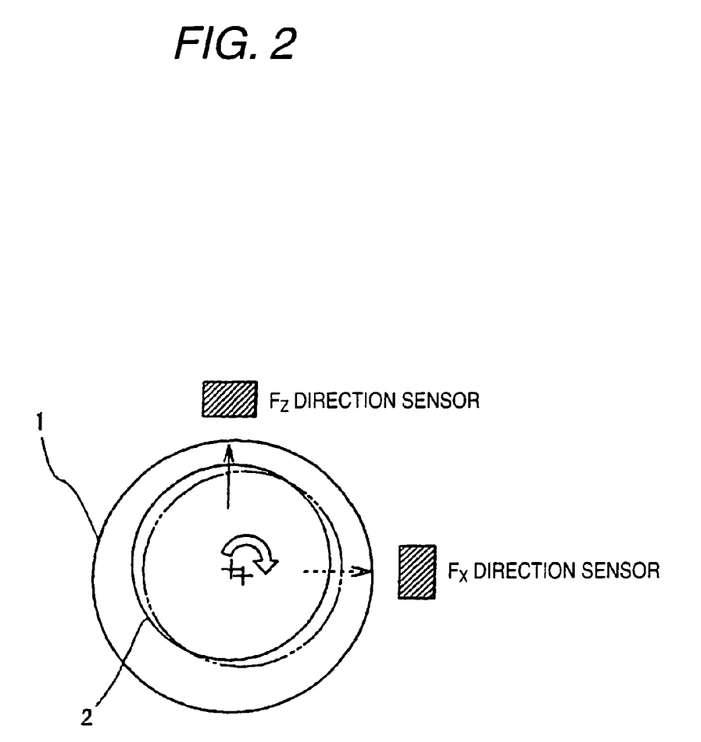
FIG. 2 is a conceptual diagram of the eccentricity of the tire.

A characteristic feature of the invention lies in that an arrangement is provided such that the eccentricity of the aforementioned tire can be detected based on the cycle of the sensor which is capable of detecting the ground contact load of the tire. FIG. 2 is a diagram illustrating the concept of the eccentricity of the tire, and if the tire, i.e., the inner shaft 2 and the inner ring member 3 (hereafter represented by the inner shaft 2) which constitute the rotating bearing ring to which that tire is mounted, are eccentric with respect to the axis of the outer ring 1 constituting the fixed-side bearing ring, the force exerted by the inner shaft 2 on the rolling elements 5 changes in correspondence with the rotational position of that inner shaft 2.

Figure 3:
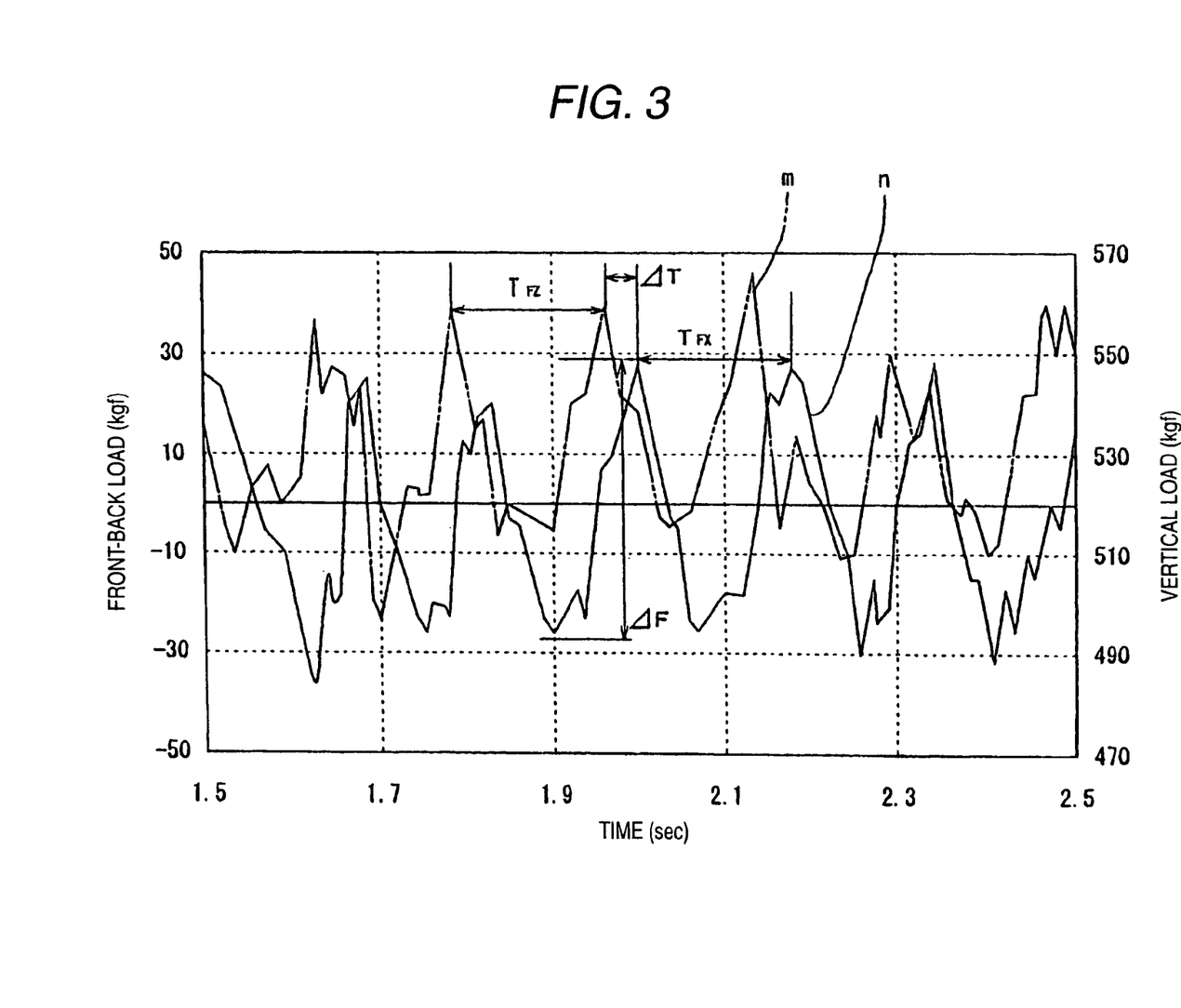
FIG. 3 is a diagram illustrating an example of detection of the vertical load and the back-and-forth load of the tire.

FIG. 3 shows an example of detection of the vertical load and the back-and-forth load of the tire, in which the abscissa is the measurement time, and the ordinate is the load. In FIG. 3, m denotes the fluctuation of the vertical load $F_Z$, and n denotes the fluctuation of the front-back load $F_X$. In a case where the tire is eccentric, the cycle of the fluctuation of the tire load attributable to that eccentricity coincides with the rotation cycle T of the tire. In addition, in a case where the tire is rotating in the direction indicated by the white arrow in FIG. 2, since the $F_Z$ direction sensor and the $F_X$ direction sensor are in a positional relationship of being offset by 90° in the circumferential direction, the fluctuation cycle of the vertical load $F_Z$ and the fluctuation cycle of the front-back load $F_X$ are in a relationship of being offset by a ¼ cycle. Specifically, the peak of the front-back load $F_X$ is detected by being offset from the peak of the vertical load $F_Z$ by a ¼ cycle.

The vertical load $F_Z$ of the tire can sometimes fluctuate slightly even in the state of normal traveling, but the front-back load $F_X$ normally does not fluctuate unless the brake is stepped on. Accordingly, in a case where the sensors are respectively disposed, for example, at an upper portion or a top portion of the fixed bearing ring and at a front portion or a rear portion of the fixed bearing ring, which is at a position orthogonal thereto with the center of the bearing as a reference, when two kinds of load fluctuations which are offset by a ¼ cycle, as shown in FIG. 3, are detected, it can be determined that the tire is eccentric.

Figure 4:
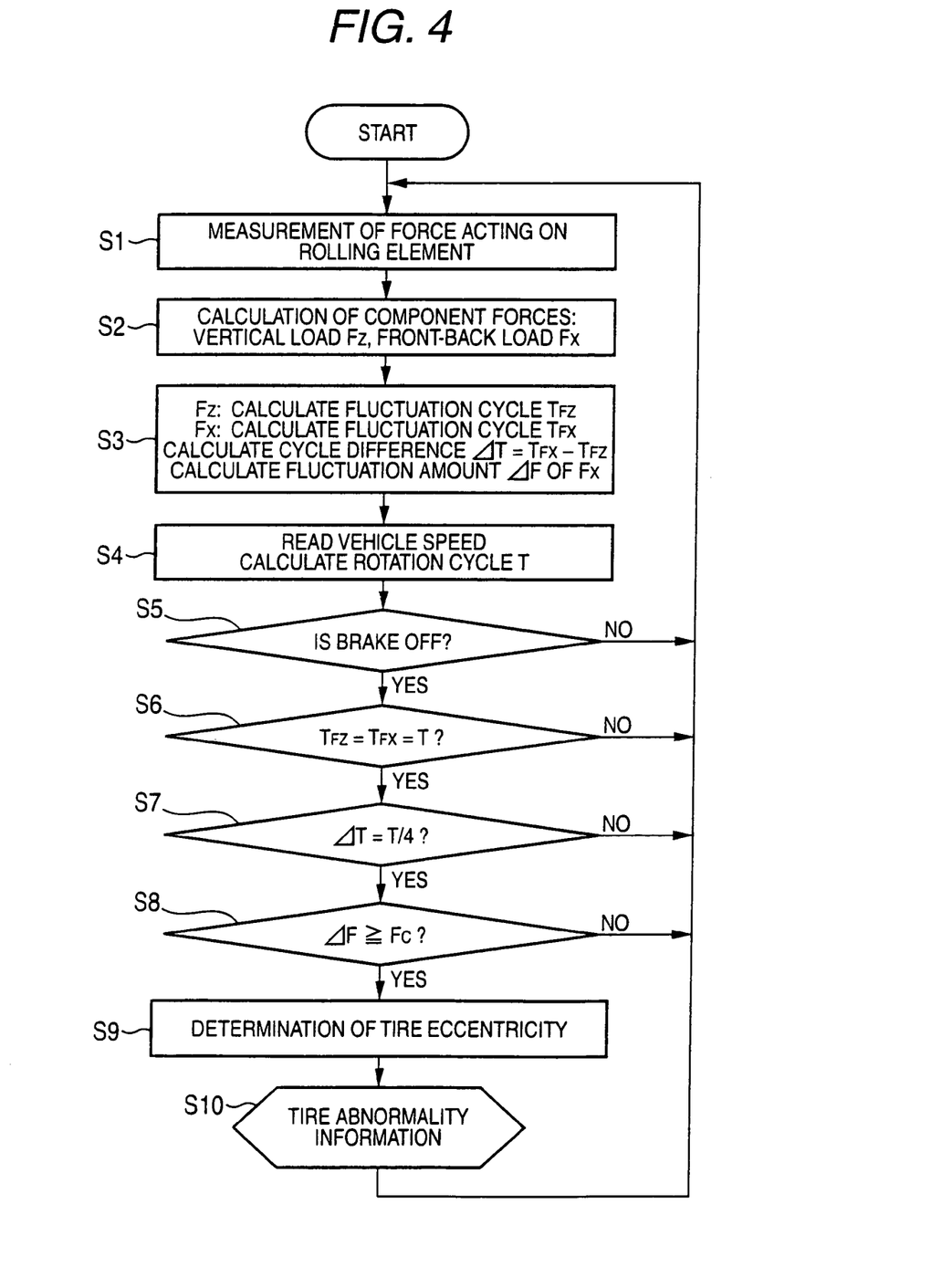
FIG. 4 is a diagram illustrating a flowchart for determining the eccentricity of the tire.

Next, referring to the flowchart shown in FIG. 4, a description will be given of an example of the flow of determination of tire eccentricity.

First, a vehicle is made to travel, and measurement is taken of the force acting on the rolling element 5 in the bearing device H by using the above-described ultrasonic sensors 41 (Step S1), and the vertical load $F_Z$ and the front-back load $F_X$ of the tire are calculated based on its result (Step S2).

Then, cycles of fluctuation $T_{FZ}$ and $T_{FX}$ of the vertical load $F_Z$ and the front-back load $F_X$ are calculated by a cycle calculating circuit, and a difference between the two cycles of fluctuation, $\Delta T$ (=$T_{FX}-T_{FZ}$), is calculated. In addition, an amount of fluctuation, $\Delta F$, of the front-back load $F_X$ of the tire, i.e., the amplitude of the fluctuation curve, is calculated (Step S3).

Next, the vehicle speed is read by a vehicle speed sensor, and the rotation cycle T of the tire is calculated from the vehicle speed obtained (Step S4). A determination is made as to whether or not the brake has been stepped on (Step S5), and if the brake has not been stepped on (brake OFF), a determination is made as to whether or not the fluctuation cycle $T_{FZ}$ of the vertical load $F_Z$ and the fluctuation cycle $T_{FX}$ of the front-back load $F_X$ calculated earlier are equal to the rotation cycle T of the tire (Step S6). If the brake has been stepped on, a front-back load is applied to the tire due to the friction with the road surface, and that effect makes it impossible to correctly detect the fluctuation of the front-back load caused by eccentricity.

If the fluctuation cycle $T_{FZ}$ of the vertical load $F_Z$ and the fluctuation cycle $T_{FX}$ of the front-back load $F_X$ calculated earlier are equal to the rotation cycle T of the tire, then a determination is made as to whether or not the difference between the fluctuation cycles $T_{FZ}$ and $T_{FX}$, $\Delta T$ (=$T_{FX}-T_{FZ}$), is ¼ of the rotation cycle T (Step S7). Then, if it is determined in Step S8 that the fluctuation amount $\Delta F$ of the front-back load $F_X$ of the tire is greater than a predetermined threshold $F_C$, a determination is made that the tire is eccentric (Step S9). Then, if the tire is eccentric, the driver is notified of the eccentricity of the tire by an alarming means such as a buzzer or a lamp (Step S10).

The aforementioned threshold $F_C$ can be determined for each kind and size of tire through experiments by taking into consideration the traveling performance and safety of vehicles. In addition, it is possible to set a plurality of thresholds and change the level of alarm to the driver in correspondence with the degree of eccentricity. Further, by conducting the experiments at various vehicle speeds, it is possible to change the settings of the thresholds in correspondence with the vehicle speeds. Since the effect of tire eccentricity is greater in the case of high-speed traveling than in the case of low-speed traveling, an arrangement may be provided such that, in the case of high-speed traveling, the threshold is made small and an alarm is issued to the driver at an earlier timing even if the eccentricity is still small.

Another characteristic feature of the invention lies in that, in order to improve the response of load detection, particularly the load detection when the vehicle is traveling at low speed, an arrangement is provided such that a rolling element outer ring passage frequency fo, which is expressed by fo=A·n·V/r(1−Da·cos θ/dm), becomes 50 Hz or more when V≦40 (km/h). In the foregoing formula, A is a constant; n is the number of rolling elements; V is a vehicle speed; r is a tire radius; Da is a rolling element diameter; θ is a contact angle; and dm is a pitch circle diameter. The constant A is $10^6/(120^2 \cdot \pi)$.

In addition, in the invention, the arrangement provided is such that the number of rolling elements is set to an odd number, and the load calculation is performed by using the output of the ultrasonic sensor on the load increasing side and the output of the ultrasonic sensor on the load decreasing side in a zigzag manner between the pair of ultrasonic sensors arranged at positions where they oppose each other with respect to the axis of the bearing device H. The load increasing side is the side where the load is relatively increasing, and the load decreasing side is the side where the load is relatively decreasing in comparison with the load increasing side. For example, in a case where a load oriented upward (in the Z-axis direction) is acting on the inner shaft 2, the uppermost portion (top portion) of the outer ring 1 is the load increasing side, and the lowermost portion (bottom portion) thereof is the load decreasing side. Similarly, when the brakes are being applied, and a load oriented in the backward direction (in the X-axis direction) of the vehicle is acting on the inner shaft 2, the front side of the vertically intermediate portion of the outer ring 1 is the decreasing side, and the rear side of the vertically intermediate portion thereof is the increasing side.

Figure 5A:
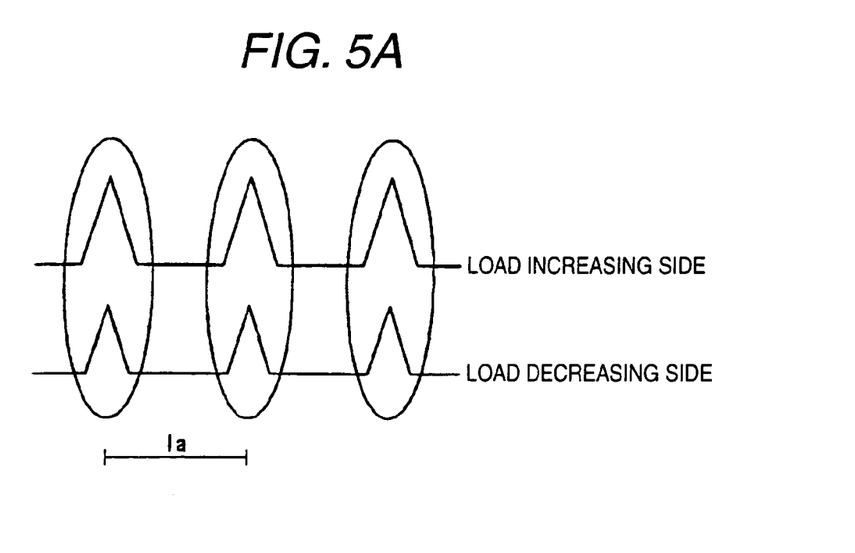
FIG. 5 shows an example of fluctuations over time of echo ratios which are detected by the ultrasonic sensors, and the part (a) is a case in which the number of the rolling elements is an even number, and the part (b) is a case in which the number of the rolling elements is an odd number.
Figure 5B:
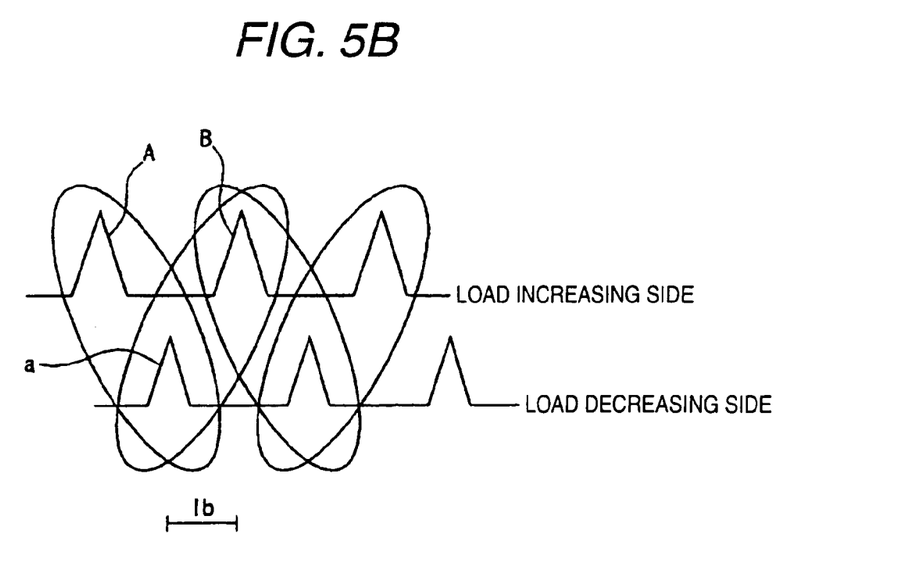

FIG. 5 shows an example of fluctuations over time of echo ratios which are detected by the ultrasonic sensors, and the part (a) is a case in which the number of the rolling elements is an even number, and the part (b) is a case in which the number of the rolling elements is an odd number. As described above, the load acting on the rolling element can be determined by using echo ratios detected for respective ones of the load increasing side and the load decreasing side from a formula determined in advance. In addition, in a case where the ultrasonic sensors are respectively disposed on upper and lower sides of the bearing device H, the left-right load and the vertical load among the load component forces acting on the bearing device H can be determined by using two echo ratios, i.e., an echo ratio h1 on the load increasing side and an echo ratio h2 on the load decreasing side. Further, the left-right load and the vertical load acting on the tire can be determined from geometrical relationships with the load component forces acting on the bearing device H. Namely, the left-right load can be determined from Fy=a(h1+h2)+b, and the vertical load can be determined from Fz=a'h1+b'h2+c'. Here, a and b are constants which are determined by the specifications of the bearing, and a', b', and c' are factors of conversion between tire ground contact area coordinates and bearing device coordinates.

It should be noted that, in the case where two echo ratios are used, only two component forces can be calculated, and when the ultrasonic sensors are disposed on the upper and lower sides of the bearing device H, the aforementioned two component forces (left-right load and vertical load) are determined, whereas when the ultrasonic sensors are disposed on the front and rear sides of the bearing device H, it is possible to determine the front-back load and the left-right load. In other words, four echo ratios are required in order to detect three component forces in the front-back direction, the left-right direction, and the vertical direction. In the case where the number of the rolling elements is an even number, the rolling elements simultaneously pass the ultrasonic sensor on the load increasing side and the ultrasonic sensor on the load decreasing side, with the result that peaks of the echo ratios are simultaneously detected, as shown in the part (a) of FIG. 5. Then, the load acting on the tire is calculated by using the upper and lower echo ratios in the drawing. Thereafter, the load acting on the tire is consecutively calculated by using upper and lower echo ratios adjacent thereto. However, the calculation of the load in the case where the number of the rolling elements is an even number cannot be performed until an ensuing rolling element passes a vicinity of the ultrasonic sensor on the load increasing side (load decreasing side), so that a decline in response constitutes a problem at the time of low-speed traveling of the vehicle when the movement of the rolling elements is slow.

In contrast, in the case where the number of the rolling elements is an odd number, a peak of the echo ratio on the load increasing side and a peak of the echo ratio on the load decreasing side are alternately detected, as shown in the part (b) of FIG. 5. Accordingly, echo ratios on the load increasing side and echo ratios on the load decreasing side can be calculated in a "zigzag" manner such as by calculating the load acting on the tire by using an echo ratio A on the load increasing side and an echo ratio a on the load decreasing side, and then calculating the load acting on the tire by using that echo ratio a on the load decreasing side and an echo ratio B on the load increasing side. As a result, a time interval Ib during the load calculation can be reduced to half as compared with a time interval Ia in the case where the number of the rolling elements is an even number. Because of this and since the aforementioned rolling element outer ring passage frequency fo is set to 50 Hz or more when V≦40 (km/h), the calculation response can be set to 50 Hz×2=100 Hz or more even when V≦40 (km/h), thereby making it possible to improve the response during the low speed.

Figure 6:
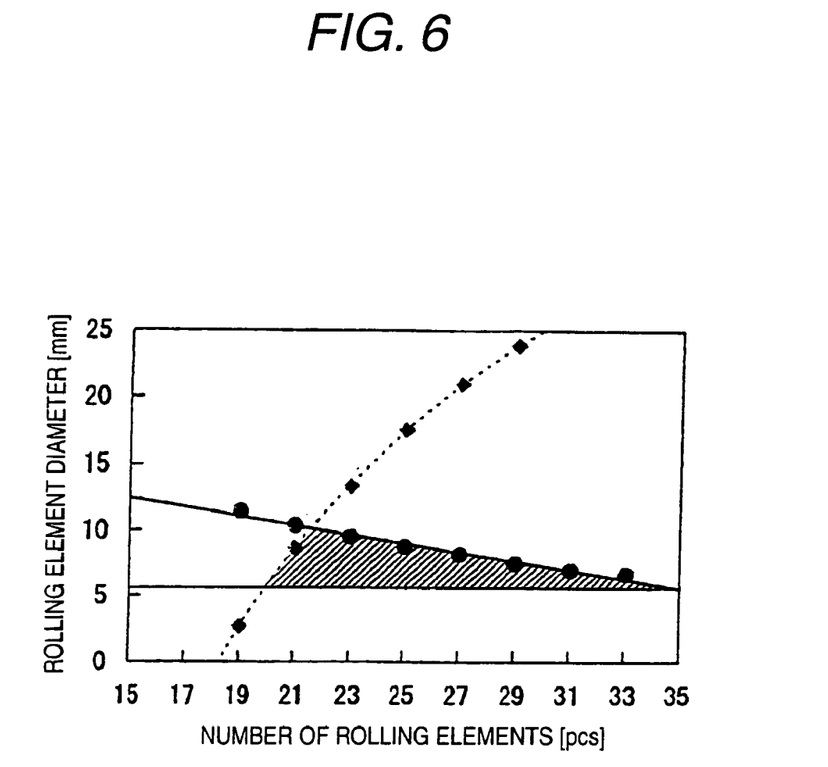
FIG. 6 is a diagram illustrating preferred ranges of the number of rolling elements and the diameter of the rolling elements.

It should be noted that, in order to increase the rolling element outer ring passage frequency fo, from the formula fo=A·n·V/r (1−Da·cos θ/dm) expressing the rolling element outer ring passage frequency fo, it suffices if, for instance, the number of the rolling elements is increased, or the diameter of the rolling elements is made small. However, if such as the size and service life of the bearing are taken into consideration, there are preferred ranges in the number and diameter of the rolling elements. FIG. 6 is a diagram illustrating an example of preferred ranges of the number of the rolling elements (balls) and the diameter of the rolling elements. If the number and diameter of the rolling elements are selected from within the range surrounded by the three straight or curved lines, the size of the bearing can be kept within a predetermined range, and the rolling element outer ring passage frequency fo can be set to 50 Hz or more when V≦40 (km/h), while ensuring the prescribed service life of the bearing. In FIG. 3, if it is assumed that the number of the rolling elements is X and the diameter of the rolling elements is Y, the straight line L shows Y=5.6 which represents a rolling element diameter (approx. 5.6 mm) providing not more than a contact pressure for ensuring the prescribed service life of the bearing. Meanwhile, the straight line M shows a maximum value (limit value) of the rolling element diameter at which the pitch circle diameter (PCD) in an arbitrary number of rolling elements becomes not more than the PCD (approx. 70 mm at maximum) of existing bearing devices for use in vehicles. Further, the straight line N shows a maximum value (limit value) of the rolling element diameter at which the measured frequency of the tire ground contact load at a vehicle speed of 40 km/h becomes 100 Hz or more. If the number of the rolling elements and the diameter of the rolling elements are selected from within the substantially triangular range surrounded by the aforementioned three straight or curved lines, the contact pressure becomes not more than that for ensuring the prescribed service life of the bearing, the PCD becomes not more than the PCD (approx. 70 mm at maximum) of existing bearing devices for use in vehicles, and the measured frequency of the tire ground contact load at a vehicle speed of 40 km/h becomes 100 Hz or more.

If a diagram such as the one shown in FIG. 6 is prepared in advance, it is possible to easily select the number and diameter of the rolling elements. It should be noted that FIG. 6 is only illustrative, and a similar diagram can be appropriately prepared in accordance with the specifications of the bearing device.

Figure 7:
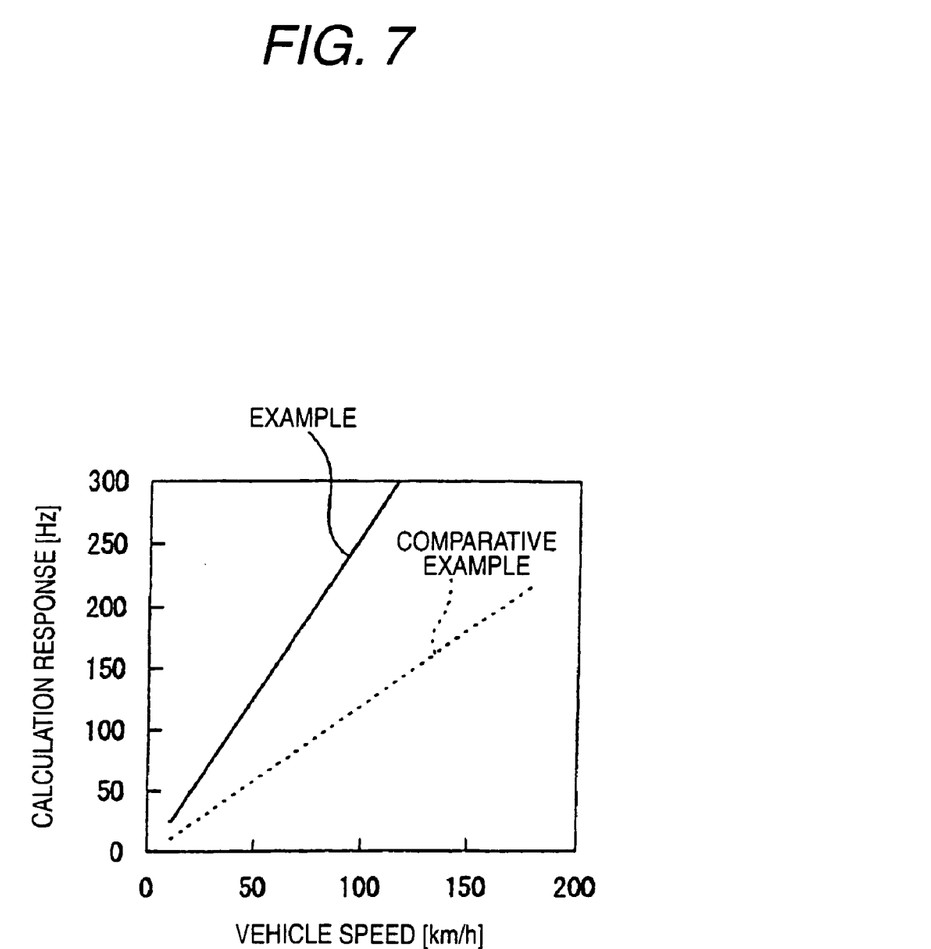
FIG. 7 is a diagram illustrating calculation responses of an Example and a Comparative Example.

FIG. 7 is a diagram illustrating calculation responses of an Example and a Comparative Example, and the major specifications of the bearing device in accordance with the Example and the Comparative Example are shown in Table 1.

TABLE 1

|  | Example | Comparative Example |
|---|---|---|
| Number of rolling elements | 23 | 11 |
| Rolling element diameter (mm) | 9.525 | 12.7 |
| Contact angle (degree) | 40 | 40 |
| Pitch circle diameter (mm) | 50.5875 | 49 |

As can be appreciated from FIG. 7, the Example showed an approximately two-fold calculation response as compared with the Comparative Example with respect to an identical vehicle speed.

The invention claimed is:

1. A rolling bearing device with a sensor comprising:
a tubular fixed bearing ring which is fixed to a vehicle body side;
a rotating bearing ring which is rotatably inserted in an interior of the fixed bearing ring and is fixed to a tire side;
rolling elements which are rollably disposed between the rotating and fixed bearing rings; and
a sensor device disposed on a fixed bearing ring side,
wherein the sensor device includes at least two sensors so as to be arranged at positions perpendicular to each other in a circumferential direction of the fixed bearing ring,
wherein the sensor device is constructed so as to be able to detect a ground contact load of the tire based on cycles of outputs obtained from the at least two sensors,
wherein a number of the rolling elements comprises an odd number,
wherein the sensor device includes at least a pair of ultrasonic sensors arranged at positions so as to oppose each other with respect to an axis of the bearing device,
wherein if it is assumed that A is a constant, n is the number of rolling elements, V is a vehicle speed, r is a tire radius, Da is a rolling element diameter, $\theta$ is a contact angle, and dm is a pitch circle diameter, a rolling element outer ring passage frequency fo, which is expressed by $fo = A \cdot n \cdot V / r(1 - Da \cdot \cos\theta/dm)$, is 50 Hz or more when $V \leq 40$ (km/h), and
wherein the sensor device is constructed so as to perform a load calculation by using an output of the ultrasonic sensor on a load increasing side and an output of the ultrasonic sensor on a load decreasing side in a zigzag manner between the pair of ultrasonic sensors.

2. The rolling bearing device with a sensor according to claim 1, wherein the at least two sensors comprise ultrasonic sensors.

3. The rolling bearing device with a sensor according to claim 1, wherein the at least two sensors comprise a sensor for detecting a load in a vertical direction of the tire and a sensor for detecting a load in a front-back direction of the tire.

4. The rolling bearing device with a sensor according to claim 1, wherein an eccentricity of the tire is arranged to be detected based on the cycles of the outputs obtained from the at least two sensors.

5. The rolling bearing device with a sensor according to claim 1, wherein the number of rolling elements n and the rolling element diameter Da (mm) are selected from within a range which is surrounded by straight or curved lines represented by:

$$Da = 5.6,$$

$$Da = an + b, \text{ and}$$

$$Da = cn^2 + dn + e.$$

* * * * *